(12) United States Patent
Stilleke et al.

(10) Patent No.: US 8,915,548 B2
(45) Date of Patent: Dec. 23, 2014

(54) FITTING FOR A VEHICLE SEAT

(75) Inventors: Martin Stilleke, Recklinghausen (DE); Eric Blass, Remscheid (DE); Arkadius Rock, Solingen (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 81 days.

(21) Appl. No.: 13/701,013

(22) PCT Filed: May 17, 2011

(86) PCT No.: PCT/EP2011/002420
§ 371 (c)(1),
(2), (4) Date: Dec. 21, 2012

(87) PCT Pub. No.: WO2011/151017
PCT Pub. Date: Dec. 8, 2011

(65) Prior Publication Data
US 2013/0090204 A1    Apr. 11, 2013

(30) Foreign Application Priority Data
May 31, 2010   (DE) .......................... 10 2010 022 615

(51) Int. Cl.
*B60N 2/02*     (2006.01)
*F16H 57/04*    (2010.01)
*B60N 2/225*    (2006.01)

(52) U.S. Cl.
CPC .............. *B60N 2/02* (2013.01); *F16H 57/0464* (2013.01); *B60N 2/2252* (2013.01)
USPC ........................................ 297/361.1; 297/362

(58) Field of Classification Search
CPC ..... B60N 2/225; B60N 2/2252; B60N 2/2254
USPC ........................................ 297/361.1, 362, 366
See application file for complete search history.

(56) References Cited

U.S. PATENT DOCUMENTS

| 4,634,181 A | 1/1987 | Pipon |
| 5,531,504 A * | 7/1996 | Schmale et al. ............... 297/362 |

(Continued)

FOREIGN PATENT DOCUMENTS

| DE | 4436 10 1 A1 | 6/1995 |
| DE | 19548 80 9 C1 | 12/1995 |

(Continued)

OTHER PUBLICATIONS

International Search Report for International Application No. PCT/EP2011/002420, dated Jul. 6. 2011.

*Primary Examiner* — Philip Gabler
(74) *Attorney, Agent, or Firm* — Foley & Lardner LLP

(57) ABSTRACT

A fitting for a vehicle seat, in particular for a motor vehicle seat, includes a first fitting part, on which a ring gear is formed, a second fitting part, on which a gear is formed. The gear meshes with the ring gear, whereby the two fitting parts are in transmission connection with each other. It also includes a rotatably supported eccentric for driving a relative rolling motion of the gear and the ring gear, wherein the eccentric rotates in the circumferential direction and is driven by a carrier. An installation space is provided between the first fitting part and the second fitting part, wherein a separating ring is arranged in the installation space. The separating ring divides the installation space into an outer installation space, and an inner installation space.

15 Claims, 4 Drawing Sheets

(56) References Cited

U.S. PATENT DOCUMENTS

Figure 3:
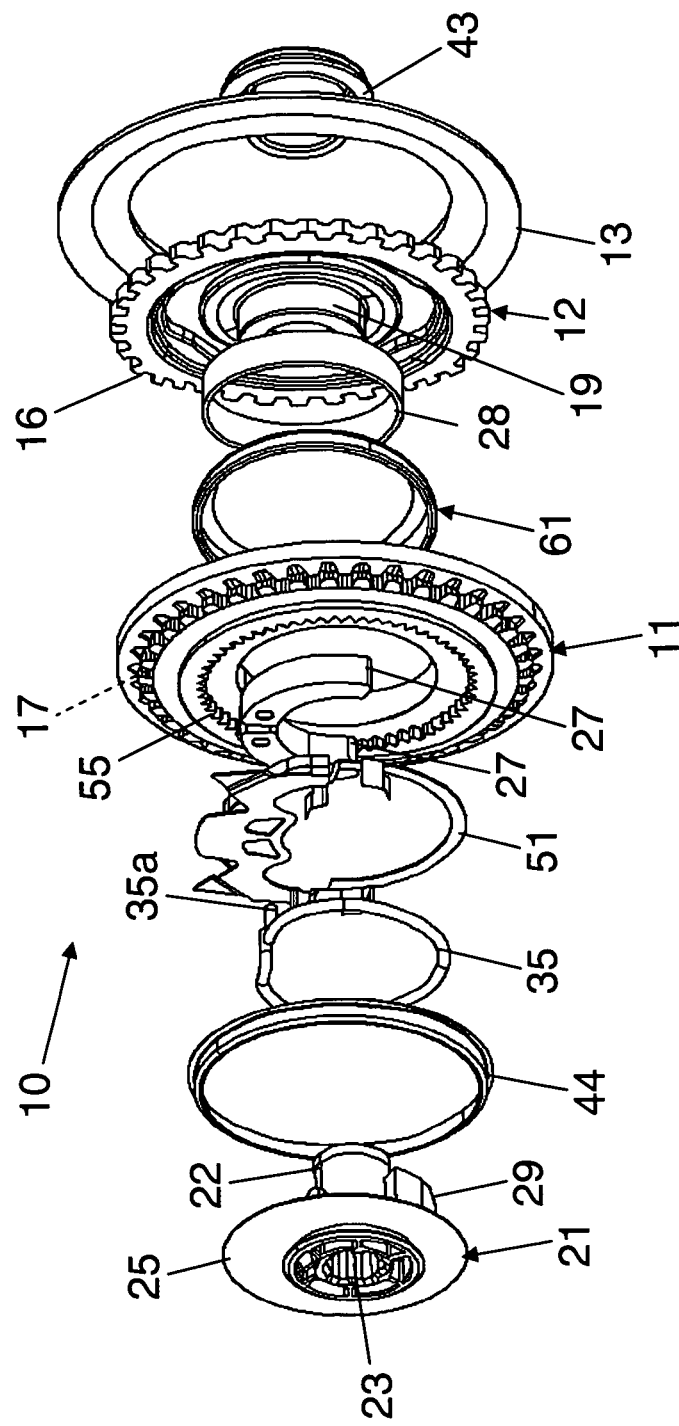

| | | |
|---|---|---|
| 6,619,743 B1 | 9/2003 | Scholz et al. |
| 6,799,806 B2 | 10/2004 | Eppert et al. |
| 7,264,566 B2 * | 9/2007 | Dill et al. .................. 475/164 |
| 7,314,250 B1 | 1/2008 | Eblenkamp et al. |
| 2007/0138853 A1 * | 6/2007 | Ito et al. .................. 297/362 |
| 2009/0127910 A1 | 5/2009 | Stilleke et al. |
| 2011/0138940 A1 * | 6/2011 | Krueger et al. .................. 74/60 |

FOREIGN PATENT DOCUMENTS

| | | |
|---|---|---|
| DE | 19938 66 6 A1 | 2/2001 |
| DE | 10105 28 2 A1 | 8/2002 |
| DE | 102008028 10 1 A1 | 12/2009 |
| WO | WO-2011/029521 A2 | 3/2011 |

* cited by examiner

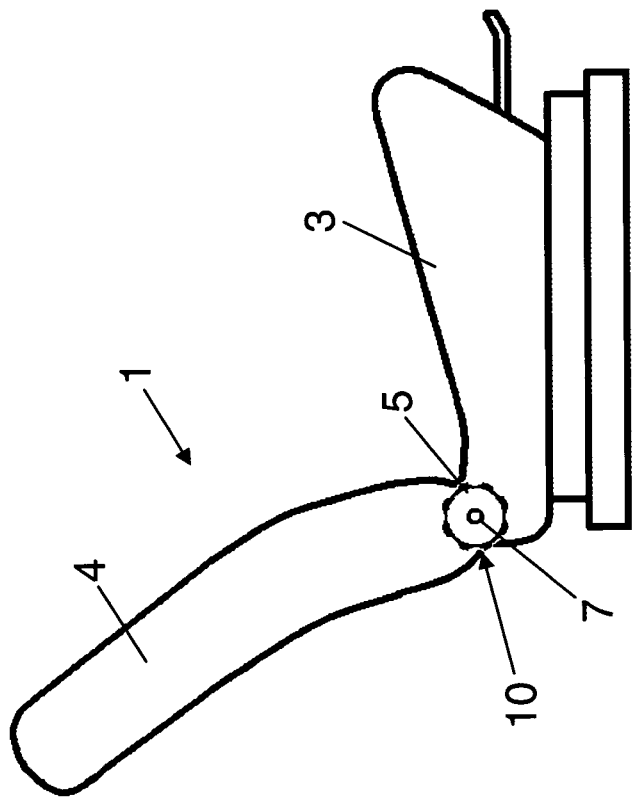
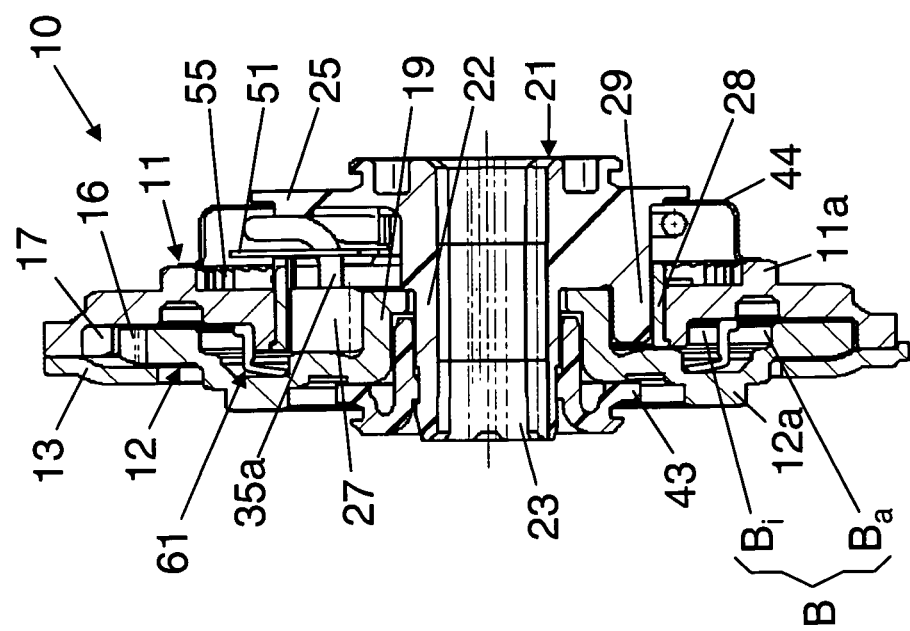
Fig. 1
Fig. 2

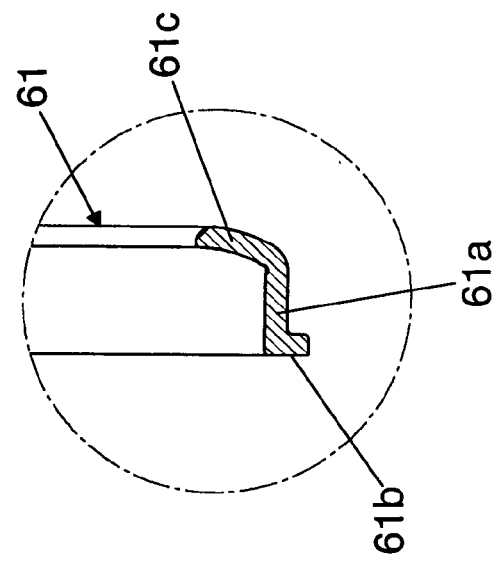
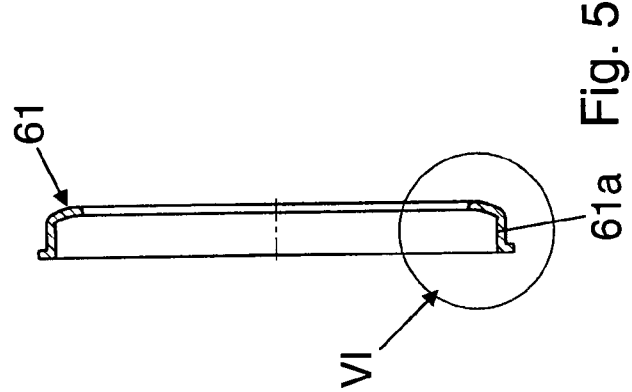
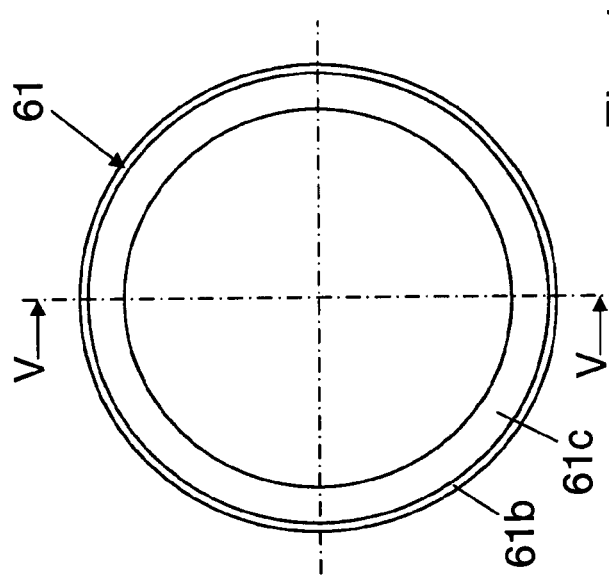

FITTING FOR A VEHICLE SEAT

CROSS REFERENCE TO RELATED APPLICATIONS

The present application is a National Stage of International Application No. PCT/EP2011/002420 filed on May 17, 2011, which claims the benefit of German Patent Application No. DE 10 2010 022 615.7 filed on May 31, 2010, the entire disclosures of which are incorporated herein by reference.

The invention relates to a fitting for a vehicle seat having the features of the preamble of claim 1.

A fitting of this type is known from DE 195 48 809 C1 or DE 199 38 666 A1. The first fitting part has a toothed ring and supports an eccentric by means of a collar, in which a driver is supported. The second fitting part has a toothed wheel and receives the eccentric. The driver terminates with a covering disk, to which a sealing ring is fixed. This sealing ring is adjacent to the second fitting part, so that the installation space between the first fitting part and the second fitting part is sealed at this point. In DE 10 2008 028 101 A1, a sealing is described for an axial gap, which, for dust particles or varnish, would build an access to the installation space between the first fitting part and the second fitting part.

The object of the invention is to create an alternative fitting to the type mentioned in the introduction. This object is achieved according to the invention by a fitting having the features of claim 1. Advantageous configurations are the subject-matter of the subordinate claims.

The separating ring subdivides the sealed installation space, so that the eccentric is separated from the gear which is defined by toothed wheel and toothed ring. This offers a further protection of the eccentric, particularly if the separating ring is in tight contact with the first fitting part and with the second fitting part. For this purpose, the separating ring is configured preferably flexibly, particularly elastically, for example of plastic material. Grease, which improves the operating characteristics of the gear and, at the same time seals off the installation space, can be provided in the gear. If grease is provided also for improving the operating characteristics of the eccentric, such grease is kept in the inner installation space, i.e. at the eccentric, by means of the separating ring. It is thus avoided that the eccentric, due to its rotation, gradually displaces the grease.

The use of an eccentric epicyclic gear system between the first fitting part and the second fitting part enables the inclination of the backrest to be adjusted continuously. The saving of a central pinion compared with a planetary gear system leads to the occurrence of a wobbling movement which is superimposed on the relative rotation of the fitting parts. The eccentric epicyclic gear system can be driven manually or by a motor.

The basic part of the locking of the eccentric epicyclic gear is provided by the friction between the eccentric and one of the two fitting parts, preferably the second fitting part which preferably has a collar for supporting the eccentric. The wedge segments which define the eccentric serve for both, locking and driving the rolling movement of toothed wheel and toothed ring. A preferably additionally provided locking element serves for locking the fitting under dynamic loads.

The formation of the toothed ring on the first fitting part which receives the eccentric and the formation of the toothed wheel on the second fitting part which supports the eccentric saves material and installation space, since the toothed wheel can be configured on the radially outer edge of the second fitting part (over which the enclosing ring fixed to the first fitting part then engages) and nevertheless there are sufficiently large connecting areas on the second fitting part for mounting the fitting.

The invention can be used preferably for adjusting the inclination of the backrest of vehicle seats in motor vehicles, but it can be used also for other applications.

Figure 9:
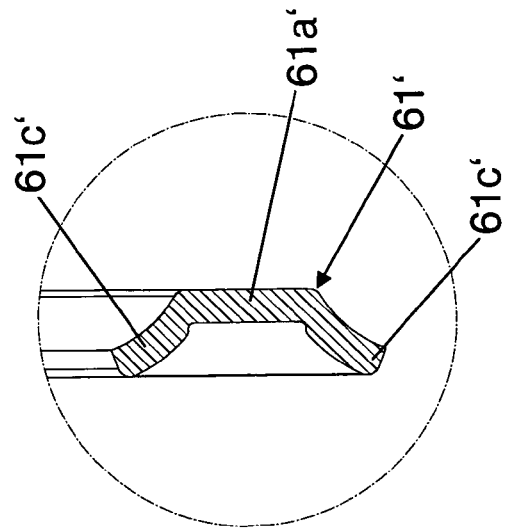
Figure 8:
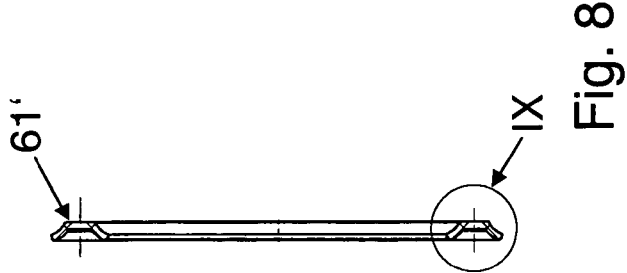
Figure 7:
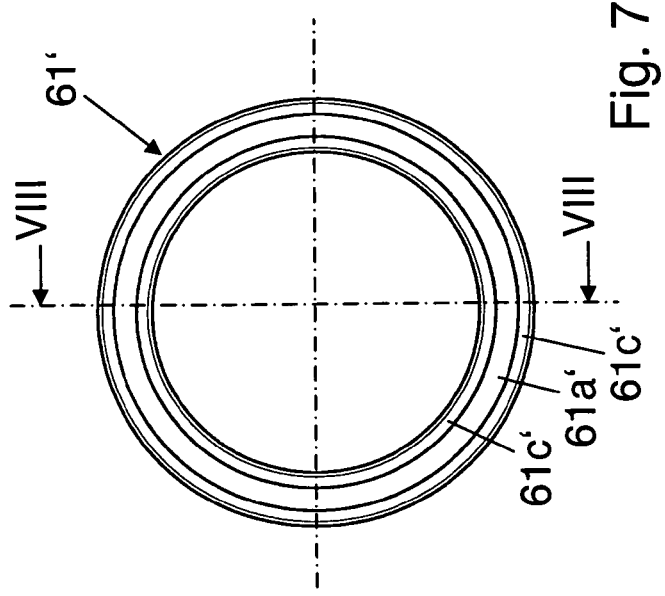

The invention is explained in more detail hereinafter with reference to an exemplary embodiment shown in the drawing, in which:

FIG. 1 shows an axial cut through the fitting,
FIG. 2 shows a schematic representation of a vehicle seat,
FIG. 3 shows an exploded view of the fitting,
FIG. 4 shows a view of a separating ring,
FIG. 5 shows a cut along the line V-V in FIG. 4,
FIG. 6 shows an enlargement of the area VI in FIG. 5,
FIG. 7 shows a view of a separating ring in a modified embodiment,
FIG. 8 shows a cut along the line VIII-VIII in FIG. 7, and
FIG. 9 shows an enlargement of the area IX in FIG. 8.

A vehicle seat 1 for a motor vehicle has a seat part 3 and a backrest 4, the inclination of which is adjustable relative to the seat part 3. In order to adjust the inclination of the backrest 4, a drive shaft 7, which is arranged horizontally in the transition region between the seat part 3 and the backrest 4, is rotated manually, for example, by means of a handwheel 5, or in a motor-driven manner, for example by means of an electrical motor. On both sides of the vehicle seat 1, the drive shaft 7 engages in a fitting 10 so that it is rotationally secure. The drive shaft 7 defines the adopted directional data of a cylinder coordinate system.

The fitting 10 has a first fitting part 11 and a second fitting part 12 which are rotatable relative to one another. Each of the two fitting parts 11 and 12 can be approximately inscribed in a circular disk shape. In order to absorb the axially acting forces, i.e. in order to hold the fitting parts 11 and 12 together, an enclosing ring 13 is provided. Such a method of holding parts together by means of an enclosing ring is described, for example, in U.S. Pat. No. 6,799,806 B2. The enclosing ring 13 which is preferably composed of metal is connected tightly to one of the two fitting parts 11 and 12, in the present case to the first fitting part 11, in an outer edge section, for example welded or beaded (at least partially in the circumferential direction). By means of an end section which is facing radially inward, the enclosing ring 13, where applicable by the interposition of a separate sliding ring, engages over the other one of the two fitting parts 11 and 12 radially outward, (i.e. in its radially outer edge section), without impeding the relative rotation of the two fitting parts 11 and 12, i.e. the enclosing ring 13 (which can have a substantially flat shape) and the fitting part 11 or 12, which is fixedly connected to it, enclose the other one of the two fitting parts 11 and 12, which is movable relative to them. From a structural point of view, the two fitting parts 11 and 12 together (with the enclosing ring 13) consequently form a disk-shaped unit.

With the mounting of the fitting 10, the first fitting part 11 is, for example, connected tightly to the structure of the backrest 4, i.e. it is fixed with respect to the backrest part. The second fitting part 12 is then connected tightly to the structure of the seat part 3, i.e. it is fixed with respect to the seat part. Those assignments of the fitting parts 11 and 12 can, however, also be exchanged, i.e. the first fitting part 11 would then be fixed with respect to the seat part and the second fitting part 12 would be fixed with respect to the backrest. The fitting 10 consequently is located in the force flow between backrest 4 and seat part 3; this is why the two fitting parts 11 and 12 are composed of metal, preferably of steel.

The fitting 10 is in the form of a gear fitting in which a first fitting part 11 and a second fitting part 12 are connected to each other by means of a gear unit for displacement and fixing in position, to be more precise, by means of an eccentric epicyclic gear system, which in the present case is self-locking as described, for example, in DE 44 36 101 A1.

In order to form the gear unit, an externally toothed wheel 16 is formed on the second fitting part 12, and an internally toothed ring 17 is formed on the first fitting part 11, the toothed wheel and the toothed ring meshing with each other. The diameter of the tip circle of the external toothing of the toothed wheel 16 is smaller by at least the depth of one tooth than the diameter of the root circle of the internal toothing of the toothed ring 17. A corresponding difference in the number of teeth of the toothed wheel 16 and the toothed ring 17 of at least one tooth permits a rolling movement of the toothed ring 17 on the toothed wheel 16. The toothed wheel 16 and the toothed ring 17 are formed preferably by means of one single stamping process which simultaneously punches the fitting parts 11 and 12 from their initial material. Alternatively, the fitting parts 11 and 12 can be manufactured—with similar geometries and same functions—by massive forming (preferably cold-flow forming or hot-flow forming). In the present case, the toothed wheel 16 forms the radially outer edge of the second fitting part 12, i.e. radially outward the second fitting part 12 is flush with the toothed wheel 16.

One of the two fitting parts 11 and 12, has a collar 19, in the present case the second fitting part 12, concentrically to the toothed wheel 16. The collar 19 can be integrally formed on (i.e. formed in one piece with) said fitting part as a collar formation or be secured thereto in the form of a separate sleeve. A driver 21 is supported rotatably in the collar 19 by means of a hub 22. The driver 21 is preferably composed of plastics material. The hub 22 of the driver 21 is provided centrally with a bore 23 for receiving the drive shaft 7. The profile of the bore 23 is configured to fit the profile of the drive shaft 7, in the present case a splined shaft profile. Adjoining its hub 22, the driver 21 has a covering disk 25 which is formed in one piece with the hub 22 and which has a larger diameter than the hub 22.

Supported on the collar 19—with their curved inner surfaces—are two wedge segments 27 which bear—with their curved outer surfaces—the other of the two fitting parts 11 and 12, in the present case the first fitting part 11. For this purpose, a receptacle of the last-named fitting part is coated with a slide bearing bush 28 which is preferably pressed in to be rotationally fixed, and against which the outer surfaces of the wedge segments 27 bear. The notions "support" and "bear" shall not be limited to a defined direction of the flow of forces by the fitting 10, since this direction depends on the mounting of the fitting 10.

The driver 21 has—spaced radially from the hub 22—a driver segment 29 which engages with clearance between the narrow sides of the wedge segments 27 and which is formed in one piece with the covering disk 25 and the hub 22. The wedge segments 27, the broad sides of which are mutually facing, each receive, with a respective recess defined by projecting sections of material, a respective angled end finger 35a of an omega spring 35. The spring 35 acts upon the wedge segments 27 in the circumferential direction, in particular in order to press them apart, it being possible during operation for the broad sides of the wedge segments 27 to touch and act on each other.

The driver 21 is secured axially on the outside of the fitting part provided with the collar 19 by a securing ring 43 which is preferably clipped on. The securing ring 43 extends in the axial direction along part of the hub 22, so that the hub 22 does not directly bear against the inside of the collar 19 but, with the interposition of the securing ring 43, is supported in the collar 19 (and consequently the driver 21 is supported on the second fitting part 12). On the outside of the fitting part provided with the slide bearing bush 28 (in the present case of the first fitting part 11), a sealing ring 44 is provided between its radially outermost edge and the covering disk 25, such sealing ring being composed for example of rubber or of soft plastics material and being connected with, in particular clipped to, the covering disk 25.

The wedge segments 27 (and the spring 35) define an eccentric which, in the extension of the direction of eccentricity, presses the toothed wheel 16 into the toothed ring 17 at an engagement site. When drive is effected by means of the rotating drive shaft 7 which rotates (several times), a torque is first of all transmitted onto the driver 21 and then, by means of the driver segment 29, onto the eccentric which is so defined and which slides along the slide bearing bush 28, shifting the direction of eccentricity and thus shifting the site of engagement of the toothed wheel 16 in the toothed ring 17, this presenting itself as a wobbling rolling movement, i.e. as a relative rotation with a superimposed wobbling movement. As a result, the inclination of the backrest 4 is continuously adjustable between several use positions.

To improve the dynamic operating characteristics, a retaining spring 51 as has been disclosed, for example in DE 195 48 809 C1, the disclosure of which is expressly incorporated herein, is still provided preferably as locking element. The retaining spring 51 in the present case cooperates with a toothing 55, which is configured as a further toothed ring at the first fitting part 11. The retaining spring 51 each time locks the wedge segments 27 in the non-driven state (by the retaining spring 51 locking the spring 35 by bearing against the end fingers 35a) and is released by the driven driver 21.

A modified configuration of the driver 21 is provided in the motor-driven versions, as described in U.S. Pat. No. 7,314,250 B1 for a one-piece driver composed of metal, for example of zinc or aluminum pressure-die casing, and in US 2009/0127910 A1 for a two-piece driver composed of a metal ring (preferably of a sintered material) with driver segment 29 and a plastic component which is rotationally fixed with it, with a hub 22 and a covering disc 25. A modified two-piece driver is shown in U.S. Pat. No. 6,619,743 B1, according to which the wedge segments are supported on its ring. The relevant disclosure of the three mentioned printed publications is expressly incorporated herein. The sealing ring 44 at the driver 21 can alternatively be composed of metal and be connected with one of the fitting parts 11 or 12.

In its interior, the fitting 10 has an installation space B (between the first fitting part 11 and the second fitting part 12), which is outwardly sealed at several points, in the present case for example by means of the sealing ring 44 between the driver 21 and the first fitting part 11, by means of grease in the area of the gear, which is defined by the toothed wheel 16 and the toothed ring 17, and by the securing ring 43 being adjacent to the second fitting part 12. The installation space is thus largely protected from intruding dirt during operation and, during manufacture, from intruding varnish.

According to the invention, a separating ring 61 is provided (FIG. 4 bis FIG. 6), which subdivides the installation space B into a (radially) outer installation space $B_a$ and a (radially) inner installation space $B_i$ (FIG. 1), the outer installation space $B_a$ being radially further outward and extending up to the gear, and the inner installation space $B_i$ being radially further inward towards the eccentric and further up to the driver 21. The separating ring 61, which preferably is configured in one piece and preferably is composed of plastic material (e.g. PA 66), has a cylindric base body 61a, from which, on an (axial) side, a collar 61b protrudes radially outward and from the other (axial) side of which a sealing lip 61c protrudes radially inward. The sealing lip 61c is—at least slightly—flexible preferably relative to the base body 61a in the axial direction, for example due to the material selected or due to a film hinge or the like. Preferably, the material of the separating ring 61 is already elastic.

The separating ring 61 on the one hand is adjacent to the second fitting part 12 (preferably with the sealing lip), and more precisely between the toothed wheel 16 and the collar 19, preferably on the (axially) inward-faced reverse side of an (axially) outward facing star shoulder 12a of the second fitting part 12, which is provided for connection, for example with the seat part 3. The separating ring 61 on the other hand is adjacent to the first fitting part 11 (preferably with the collar), and precisely radially between the toothed ring 17 and the receptacle which is coated with the slide bearing bush 28 (wherein the latter preferably is defined by a second collar), preferably on the (axially) inward-faced reverse side of an (axially) outward facing ring shoulder 11a of the first fitting part 11, which bears the toothing 55 and which is provided for connection, for example with the backrest 4. The sealing lip 61c makes it possible for the separating ring 61 to be adjacent to both fitting parts 11 and 12 in a sealing manner, and, if necessary, also enables a pre-tension. At the same time, a tolerance compensation is thus possible.

The separating ring 61 provides for the grease for the eccentric 27,27 contained in the inner installation space $B_i$ remaining in the inner installation space $B_i$, so that it consequently does not flow into the outer installation space $B_a$ and gets lost for the lubrication of the eccentric. Preferably, the installation space B is subdivided further, for example, by the driver 21 being adjacent to the front side of the collar 19 with a radially protruding area of the hub 22, for example as a counter-stop to the bearing of the securing ring 43 against the second fitting part 12.

In a modified configuration (FIG. 7 to FIG. 9), the separating ring 61' is provided, which has a ring-shaped base body 61a' and two sealing lips 61c'. The base body 61a' is adjacent to one of the two fitting parts 11 or 12, for example to the second fitting part 12, while the two sealing lips 61c" are adjacent to the first fitting part 11. Bearing could also be exactly reversed.

The separating ring 61 can be used independently of the exact configuration of the eccentric epicyclic gear. The separating ring 61 thus can subdivide the installation space B between the first fitting part 11 and the second fitting part 12 into an outer installation space $B_a$ (mainly without grease) and an inner installation space $B_i$ (with grease), even if the bearing arrangement for the eccentric is reversed, i.e. the collar 19 on the first fitting part 11 is provided concentrically to the toothed ring 17, while the receptacle on the second fitting part 12, such receptacle being coated with the slide bearing bush 28, is provided concentrically to the toothed wheel 16. Just as well can the separating ring 61 be used, if the second fitting part 12 does not bear the toothed wheel 16 at the radially outer edge but—maintaining the disk-shaped unit—also has a ring-shaped flange area or if, —instead of the disk-shaped unit—both fitting parts 11 and 12 each have, in a partial section in the circumferential direction, radially protruding flanges, as described, for example, in DE 44 36 101 A1 or in US 2009/0127910 A1. The use of the separating ring 61 is possible also in the above-named motor-driven versions, with a modified driver 21.

LIST OF REFERENCE NUMERALS

1 vehicle seat
3 seat part
4 backrest
5 handwheel
7 drive shaft
10 fitting
11 first fitting part
11a ring shoulder
12 second fitting part
12a star shoulder
13 enclosing ring
16 toothed wheel
17 toothed ring
19 collar
21 driver
22 hub
23 bore
25 covering disk
27 wedge segment
28 slide bearing bush
29 driver segment
35 spring
35a end finger
43 securing ring
44 sealing ring
51 locking spring
55 toothing
61, 61' separating ring
61a, 61a' base body
61b collar
61c, 61c' sealing lip
B installation space
$B_a$ outer installation space
$B_i$ inner installation space

The invention claimed is:

1. A fitting for a vehicle seat, comprising:
a first fitting part on which is formed a toothed ring;
a second fitting part on which is formed a toothed wheel which meshes with the toothed ring, as a result of which the two fitting parts are in gear connection with each other;
a rotatably supported circumferential eccentric, driven by a driver, for driving a relative rolling movement of the toothed wheel and the toothed ring;
an installation space provided between the first fitting part and the second fitting part, such installation space being at least in some places outwardly sealed; and
a separating ring arranged in the installation space, such separating ring subdividing the installation space into a radially outer installation space, which is located towards the gear which is defined by toothed wheel and toothed ring, and into a radially inner installation space, which is located towards the eccentric,
wherein the installation space contains grease for the eccentric.

2. A fitting according to claim 1, wherein the separating ring is adjacent to the first fitting part on the one hand and to the second fitting part on the other hand.

3. A fitting according to claim 2, wherein the separating ring is adjacent in a sealing manner to the first fitting part on the one hand and to the second fitting part on the other hand.

4. A fitting according to claim 2, wherein the separating ring is adjacent with pre-tension to the first fitting part on the one hand and to the second fitting part on the other hand.

5. A fitting according to claim 1, wherein the separating ring has a cylindrical or a ring-shaped base body, from which at least one of a collar and a sealing lip protrudes on at least one side.

6. A fitting according to claim 5, wherein at least one of the base body and the collar and the sealing lip is adjacent to one of the two fitting parts.

7. A fitting according to claim 1, wherein the separating ring is at least one of composed of plastic material and configured to be elastic.

8. A fitting according to claim 1, wherein an enclosing ring axially holds together the first fitting part and the second fitting part forming a disk-shaped unit.

9. A fitting according to claim 8, wherein the enclosing ring is fixed to the first fitting part and engages over the second fitting part radially outside.

10. A fitting according to claim 8, wherein the enclosing ring has a substantially flat shape.

11. A motor vehicle seat with at least one fitting according to claim 1, having a seat part which is connected with one of the two fitting parts, and a backrest, which is connected with the other one of the two fitting parts.

12. A fitting according to claim 1, wherein the first fitting part receives the eccentric via a slide bearing bush which is concentric to the toothed ring.

13. A fitting according to claim 1, wherein the second fitting part supports the eccentric via a collar which is concentric to the toothed wheel.

14. A fitting according to claim 1, wherein the eccentric has two wedge segments.

15. A fitting according to claim 14, wherein one spring acts upon the wedge segments in the circumferential direction.

* * * * *